UNITED STATES PATENT OFFICE.

EMIL BRAUN, OF NEW YORK, N. Y.

PROCESS OF MAKING VANILLA FLAVORING-POWDER.

SPECIFICATION forming part of Letters Patent No. 687,974, dated December 3, 1901.

Application filed January 28, 1901. Serial No. 45,112. (No specimens.)

*To all whom it may concern:*

Be it known that I, EMIL BRAUN, a citizen of the United States, residing at New York, in the county of New York and State of New York, have invented certain new and useful Improvements in Processes of Making Vanilla Flavoring-Powder; and I do declare the following to be a full, clear, and exact description of the invention, such as will enable others skilled in the art to which it appertains to make and use the same.

The object of this invention is to prepare a vanilla compound without the aid of a powerful solvent or extracting fluid, such as alcohol, and so that the full flavor of the vanilla-bean itself, not an extract from it, will be obtained and the strength and delicacy of the flavor of the bean be preserved and be found alone in the compound and the latter be secured in all its integrity free from those injurious results which so often occur when alcohol or spirits are used to extract the flavor of the bean.

The invention consists in a novel process of extracting and compounding by admixture with sugar the flavoring portions or principles of the bean, substantially as hereinafter described, and pointed out in the claim.

My mode of procedure is as follows: I take, say, one ounce of the best cured Mexican vanilla-bean and three-fourths of a pound of the best hard loaf-sugar. The vanilla-bean is then cut up into small squares or pieces and placed in a stone, marble, or other like mortar, together with about one-third of the quantity of the sugar named, and the whole well pounded with a hard wood or other suitable pestle. As the small portion of sugar thus introduced becomes finely reduced more sugar is gradually added until the whole three-fourths of a pound or quantity of it is incorporated and powdered with the bean, the seeds of the bean being retained in the mass. Instead of the mortar pounding process the crushed bean and sugar may be passed through stone or steel rollers, adding one-quarter of the sugar first, then adding more sugar, and passing all through rollers again and again until all sugar is used. The whole is then put in an air-tight case and kept at about 95° Fahrenheit for from six to seven days. All the seeds and gummy parts of the bean will be found separated from its shells and will be taken up and be dried or absorbed by the sugar. I then put the whole mass into a coarse grinding-mill of any suitable kind—one similar to a spice-mill, for instance—and the whole is reduced. This is then passed through a medium fine sieve. The parts remaining in the sieve are then put into a suitable air-tight covered vessel and mixed with a small quantity—say a half-pint—of water. This vessel is then set into a steam-bath or boiling-water bath for several hours until the vanilla particles are thoroughly softened. After that this fluid is mixed with sufficient fine sugar to form a dry mass. This is then mixed with the fine mass that has passed through the sieve. The whole is then run through a grinding mill or mills several times, the mill set finer each time, and then all is sifted through a very fine sifting apparatus, with a suitable brush attached or otherwise arranged to deliver the whole compound as fine as dust in a closed receptacle. After this the compound thus produced should be put in air-tight cases, cans, or cylinders and be kept in a moderately warm place, ranging, say, from 85° to 100° Fahrenheit, for from eight to ten days, when it will be ready for use or being packed. This last treatment greatly improves the strength of the flavor of the compound by causing any flavor which may be separated from the vanilla or bean to be taken up by the sugar and virtually makes the sugar of as strong a vanilla flavor as the particles of the bean mixed with the sugar, although the sugar largely predominates in quantity, and the whole compound will have a genuine vanilla flavor. This procedure of exposing the sugar and vanilla to the heating process above mentioned and confining the finished product while exposed to the heat in an air-tight receptacle conveys to such sugar the genuine vanilla flavor, which cannot otherwise be obtained.

Another great advantage of this process is that the above compound not only does not lose strength of flavor by being exposed uncovered to heat or air after being ready prepared for shipment or use, but it also improves during baking process when used in cakes or pastry.

Having thus described my invention, what

I claim as new, and desire to secure by Letters Patent, is—

The process herein described of making vanilla powder, made up of the vanilla-bean and sugar, which consists in first pulverizing the bean and sugar combined, then packing the whole, in an air-tight case and retaining the same at a temperature of from 85° to 100° Fahrenheit for several days, then sifting the mass through a fine sieve, then grinding the portion of the mass remaining in the sieve, then mixing and finely sifting the two products thus obtained, substantially as described.

In testimony whereof I have hereunto set my hand in presence of two subscribing witnesses.

EMIL BRAUN.

Witnesses:
PETER SCHMACK,
SELENA EPSTEIN.